US012708917B2

(12) United States Patent
Knight

(10) Patent No.: US 12,708,917 B2
(45) Date of Patent: Aug. 18, 2026

(54) INTEGRAL LOCKING MECHANISM FOR RECIPROCATING PUMPS

(71) Applicant: RIEKE PACKAGING SYSTEMS LIMITED, Leicestershire (GB)

(72) Inventor: Simon Christopher Knight, Bridgend (GB)

(73) Assignee: RIEKE PACKAGING SYSTEMS LIMITED, Leicestershire (GB)

( * ) Notice: Subject to any disclaimer, the term of this patent is extended or adjusted under 35 U.S.C. 154(b) by 141 days.

(21) Appl. No.: 18/711,319

(22) PCT Filed: Nov. 21, 2022

(86) PCT No.: PCT/EP2022/082683
§ 371 (c)(1),
(2) Date: May 17, 2024

(87) PCT Pub. No.: WO2023/094337
PCT Pub. Date: Jun. 1, 2023

(65) Prior Publication Data

US 2025/0010320 A1 Jan. 9, 2025

Related U.S. Application Data

(60) Provisional application No. 63/281,155, filed on Nov. 19, 2021.

(51) Int. Cl.
*B05B 11/10* (2023.01)

(52) U.S. Cl.
CPC ...... *B05B 11/1059* (2023.01); *B05B 11/1008* (2023.01); *B05B 11/1087* (2023.01)

(58) Field of Classification Search
None
See application file for complete search history.

(56) References Cited

U.S. PATENT DOCUMENTS 4,509,661 A * 4/1985 Sugizaki .............. B05B 11/043 239/327
4,511,065 A * 4/1985 Corsette ............. B05B 11/0044 222/401
4,732,549 A 3/1988 Von Schuckmann
5,664,703 A * 9/1997 Reifenberger ...... B05B 11/1067 222/207
6,053,364 A 4/2000 Heijden
(Continued)

FOREIGN PATENT DOCUMENTS

EP 0098939 1/1984
FR 2697505 5/1994
(Continued)

OTHER PUBLICATIONS

Patent Cooperation Treaty (PCT), International Search Report and Written Opinion for Application PCT/EP2022/082683 filed Nov. 21, 2022 mailed Mar. 2, 2023 International Searching Authority, EP.

*Primary Examiner* — Matthew W Jellett
(74) *Attorney, Agent, or Firm* — McDonald Hopkins LLC

(57) ABSTRACT

A locking collar for a reciprocating pump is contemplated. The collar remains affixed to the pump to avoid the creation of unwanted waste, while simultaneously providing selectively uplocking. The collar includes axial one or more axial stoppers that cooperate with a peripheral stopper on the closure cap.

12 Claims, 9 Drawing Sheets

(56) References Cited

U.S. PATENT DOCUMENTS

| | | | | |
|---|---|---|---|---|
| 6,840,408 | B1 * | 1/2005 | Foster | B05B 11/1087 222/321.9 |
| 7,735,688 | B2 * | 6/2010 | Foster | B05B 11/1001 222/153.13 |
| 7,802,701 | B2 * | 9/2010 | Jahan | B05B 11/1059 222/384 |
| 8,356,732 | B2 | 1/2013 | Heijden | |
| 8,490,833 | B2 | 7/2013 | Heijden | |
| 9,352,347 | B2 | 5/2016 | Arminak | |
| 10,898,034 | B1 | 1/2021 | Arminak | |
| 11,938,496 | B2 * | 3/2024 | Carta | B05B 11/1059 |
| 2011/0272432 | A1 * | 11/2011 | Baughman | B05B 11/1087 222/145.5 |
| 2011/0297700 | A1 * | 12/2011 | Santagiuliana | B05B 11/106 222/336 |
| 2012/0091229 | A1 * | 4/2012 | Laidler | B05B 11/026 222/207 |
| 2015/0284177 | A1 * | 10/2015 | Patil | B05B 11/1059 222/153.04 |
| 2019/0143354 | A1 | 5/2019 | Fries | |

FOREIGN PATENT DOCUMENTS

| | | |
|---|---|---|
| WO | 2008045820 | 4/2008 |
| WO | 2010089599 | 8/2010 |
| WO | 2010100544 | 9/2010 |
| WO | 2014078478 | 5/2014 |

* cited by examiner

INTEGRAL LOCKING MECHANISM FOR RECIPROCATING PUMPS

CROSS REFERENCE TO RELATED APPLICATIONS

This application is a 35 U.S.C. § 371 national stage application of PCT Application No. PCT/EP2022/082683 filed on Nov. 21, 2022, which claims priority to U.S. Provisional Patent Application 63/281,155 filed on Nov. 19, 2021, each of which is are incorporated by reference in their entireties.

TECHNICAL FIELD

This application relates generally to pump dispensers and, more specifically, to polymeric pump dispensers, made without metallic components, for locking the reciprocating plunger in place during shipment and for providing evidence of tampering, all without creating detachable plastic waste.

BACKGROUND

Containers for everyday household fluid products, such as soaps, cleaners, oils, consumable liquids, and the like, can be outfitted with dispensing pumps to improve a consumer's ability to access and use the fluid. Dispensing pumps of this type usually rely upon a reciprocating pump, driven by a compressible, metallic biasing member.

These products tend to be single use, thereby giving rise to concerns about sustainability. Increasingly, regulatory authorities are requiring consumer products to use packaging and designs that can easily be recycled. As a practical matter for businesses relying on pump dispensers, it is becoming increasingly important to design these pumps to be made only from polymeric materials and, more preferably, from a single grade of polymer. In this manner, such "all-polymer" pumps can be recycled without the need to disassemble and/or separate out metal parts and components made from difficult to recycle materials. In that regard, metallic or foil parts, thermosetting resins, specialized elastomers, some combinations of thermoplastics, and other materials might be non-recyclable or require temperatures/conditions for recycling that are incompatible with the materials used in the other parts within the design.

Especially with respect to certain types of soaps and cleaning agents, suppliers prefer to dispense their product in a foamed state. Such foams can be created by mixing a prepackaged fluid with air drawn from the ambient environment. Volumetrically, more air than liquid is normally used to form these foams, with common ratios of air:liquid ranging between 8:1 and 15:1 at preferred foam volume sizes between 0.5 and 2.0 $cm^3$ (with 0.8 $cm^3$ and 1.5 $cm^3$ dose sizes being most common).

The amount of air mixed with liquid to produce foam directly impacts the number of doses a given container size can produce. However, the amount of air mixed with liquid also impacts the characteristics of the foam itself. As more air is introduced, the foam tends to feel "drier" and may retain its shape more readily than a foam having comparatively more liquid. Accordingly, foam dispensers often require very specific dispensing conditions to produce specific characteristics for the dispensed foam. Also, because of their convenience, consumer products sellers with foamed products usually prefer reciprocating style foaming pumps, in comparison to inverted and/or bottle-squeezed foamers (where different driving forces and gravity heavily influence/alter the design).

Conventional reciprocating foam pumps require a biasing member to create movement between an actuator (or plunger) and a fixed element on the container (usually a closure cap coupled to separate chambers liquid and air). These designs rely upon rigid, coaxially-aligned cylinders defining those liquid and air chambers, while a piston moves within at least one chamber to create suction to draw the fluids along their desired paths. Examples of such dispensers can be found in U.S. Pat. Nos. 6,053,364; 8,490,833; 9,352,347; and 10,898,034.

Notably, most of these foaming dispensers rely upon metallic springs. Only U.S. Pat. No. 10,898,034 contemplates an all-plastic design for the creation of foam by mixing air and liquid, and it relies upon a deformable dome-shaped body that drives movement of separate air and liquid pistons within a rigid pump body. Most foam dispensers, including the the '034 patent, rely upon rigid cylindrical bodies to serve as variable volume chambers for air and, separately, liquid.

U.S. Pat. No. 8,356,732 contemplates foam dispensers with a bellows positioned above the actuator outlet with a sponge positioned in it to facilitate formation of foam. However, air is drawn from the head space within the container-effectively making the head space the air chamber but thereby requiring air to regularly and freely pass through the closure into the container (creating a potential source of leakage when the pump is handled). Also, with the bellows prominently above the dispensing outlet, it is difficult/impossible for a user to actuate and receive foam with only one hand, and consumer products sellers often do not like the aesthetics of such designs.

The ability to ship a dispensing pump without it accidentally leaking or actuating is of increasing interest in this industry. Consequently, conventional reciprocating pumps must either be provided with "down-lock" functionality in which additional features (e.g., screw threaded interfaces along the piston/stem proximate to the actuator head and pump body/closure) prevent the actuator head from extending outward. Unfortunately, such features place greater mechanical stress on the biasing member/spring. To the extent that biasing member is plastic, prolonged "lock down" can negatively impact or even cause failure of the spring.

"Up-lock" features typically rely upon rotating the actuator head relative to the closure between positions that block or allow axially movement. These up-lock arrangements do not stress the spring because the head is full extended, but they must strike a balance between the ease with which the head can be rotated and the need for the pump to withstand handling during shipment prior to use (i.e., the pump should not easily "slip out" of its locked position). Users also tend to dislike rotation-based locks because it can be difficult to discern when the actuator is in a locked vs. dispensing position.

Given these difficulties, current up-lock features rely upon a C-shaped clip that abuts the actuator head and closure. This clip acts as an absolute lock because it prevents any down or dispensing strokes from being applied to the actuator head until it is removed. The drawback with such clips is that they must be removed and discarded, thereby creating additional and undesirable loose plastic waste.

Recent legislative and regulatory attention has focused on the elimination of this sort of loose plastic waste. As a result, manufacturers are desire designs that keep previously discarded plastic parts attached to an article, usually by way of an integrally molded tether. However, these tethers are not always practical, especially when positioned proximate to moving parts. Additionally, the aesthetic appearance created by a tethered component is not always preferred.

In view of the foregoing, a foaming pump dispenser made only from recyclable polymeric materials would be welcome. Specifically, a reciprocating pump that did not require disassembly and separation of parts into separate recycling streams is needed, as is a pump design capable of being selectively held in the up lock position without detachable clips or tethered parts. Lastly, a locking mechanism for a reciprocal foaming pump that also improves and allows for the ability to adjust the characteristics of the dispensed foam would be ideal.

SUMMARY OF INVENTION

Without intending to be limited by the following summary, a locking collar for a reciprocating pump is contemplated. The collar remains affixed to the pump to avoid the creation of unwanted waste, while simultaneously providing selectively uplock functionality to minimize unnecessary compressive stress on the biasing member and to improve the ability to ship the pump in e-commerce channels. The collar includes axial one or more axial stoppers that cooperate with a peripheral stopper on the closure cap. Specific features of the invention will be appreciated upon closer examination of the appended drawings, description, and claims.

DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

In FIG. 1B, a quarter section of the locking collar is omitted to provide a view of the biasing member concealed by the locking collar, as well as how the locking collar may interface with the closure cap.

FIG. 2B is an isolated, exploded side plan view of the major components of the pump in FIG. 2A, while

FIG. 3A is a three dimensional exploded view of the major interfacing components required for the locking collar, including the actuator head, the locking collar, and the closure cap, while

FIG. 5A is a side plan view of the locking collar, while

FIG. 6A is a three dimensional, perspective view of the closure cap along its top facing, highlighting the stopping shoulder and its various features, while

DESCRIPTION OF INVENTION

Operation of the invention may be better understood by reference to the detailed description, drawings, claims, and abstract-all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Figure 1A:
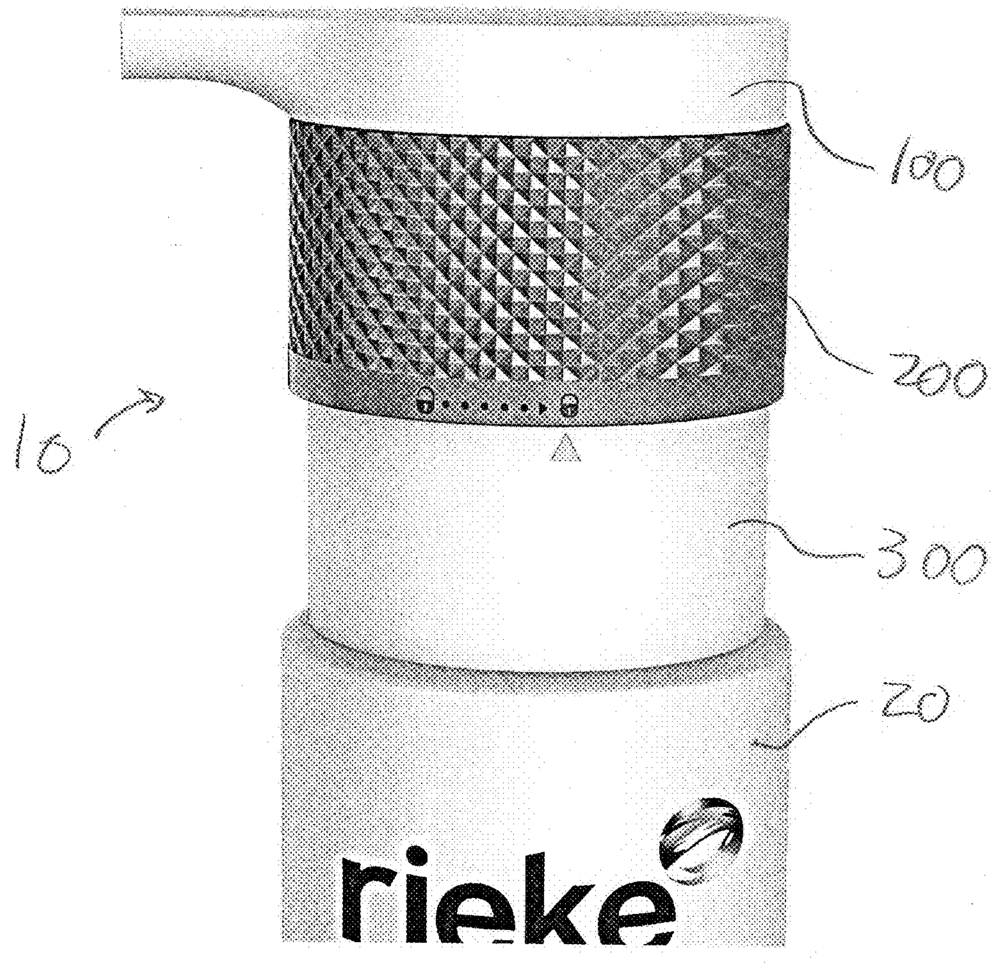
FIGS. 1A and 1B are three dimensional, perspective views of the dispenser pump and locking collar as installed on a container and contemplated herein.
Figure 1B:
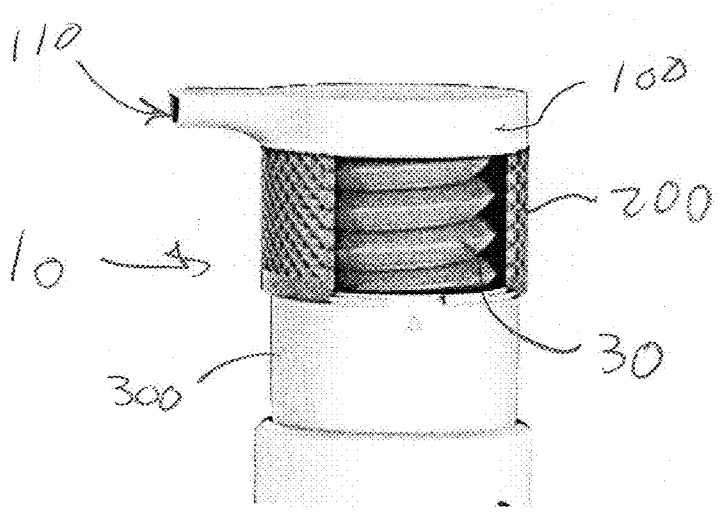
Figure 2A:
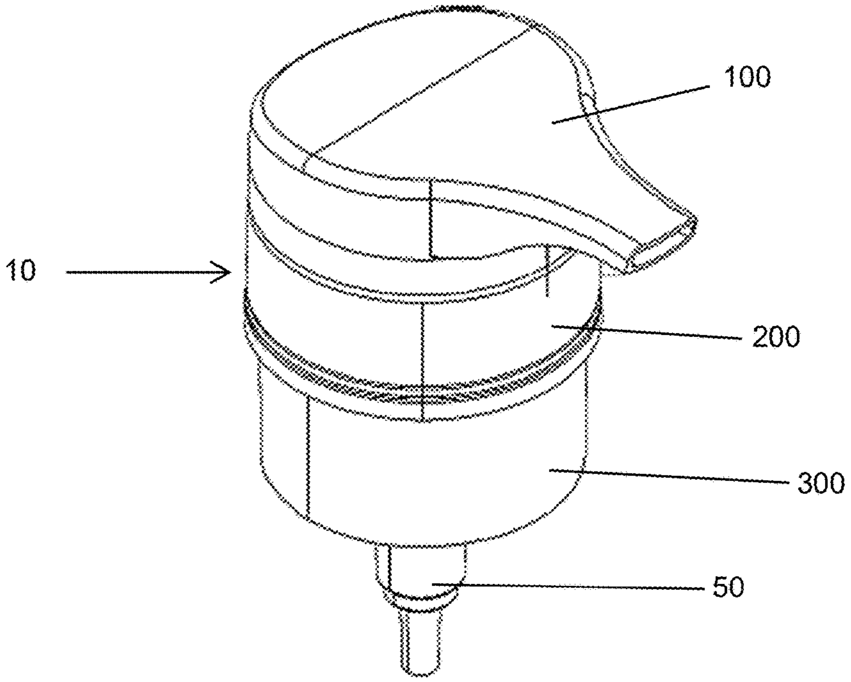
FIG. 2A is a three dimensional, perspective view of the dispenser pump and locking collar, isolated from the container.
Figure 2B:
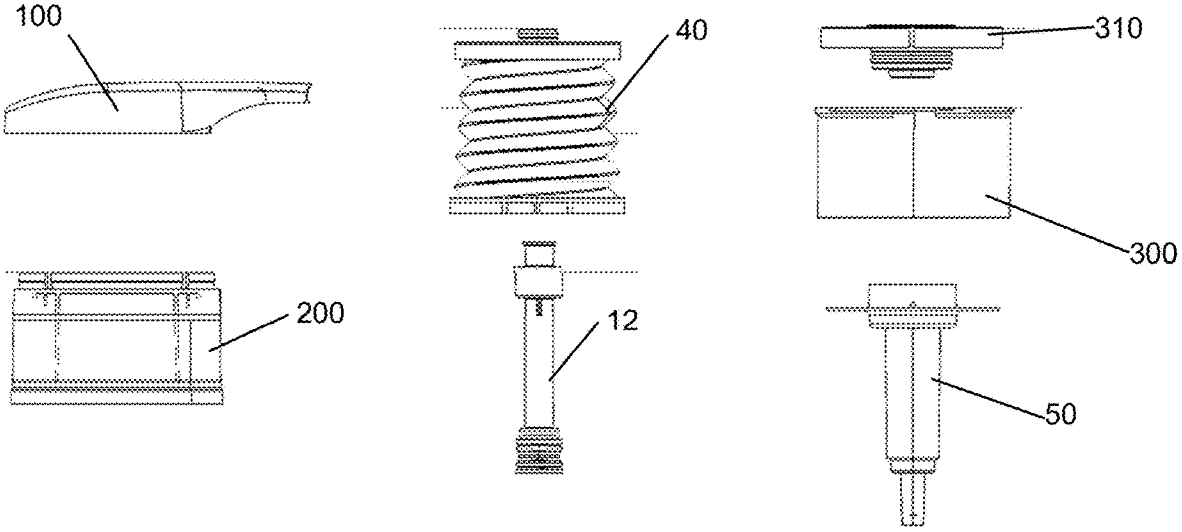
Figure 2C:
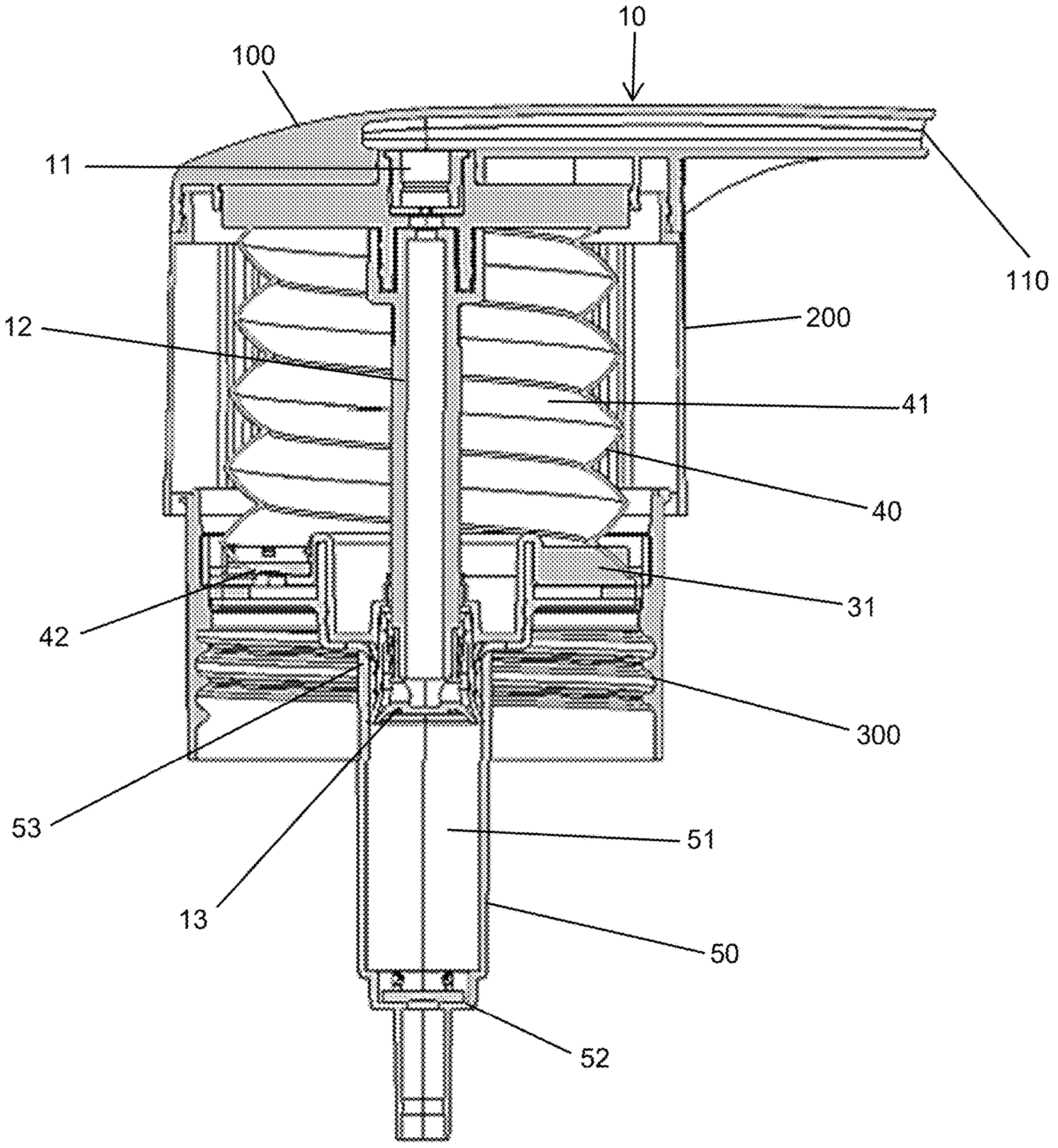
FIG. 2C is a cross sectional side view taken along the diameter of the pump in FIG. 2A.

A reciprocating foam pump, preferably incorporating an all-plastic design including a bellows that doubles as an air chamber is contemplated. This design, as shown in FIGS. 2A through 2C, is particularly amenable to use with the integral locking collars described herein. Nevertheless, the locking collar contemplated herein could be used with conventional foamer designs relying upon metallic or other types of biasing members. Thus, while an all-plastic foamer is specifically described, the use of various aspects of the locking collar is not necessarily limited to only a bellows biasing member as shown.

With respect to the foam-dispensing pump of FIGS. 1A to 2C, foam-dispensing pump 10 includes a locking collar 200 interposed between an actuator head 100 and a closure cap 300. The pump 10 is affixed to a container 20. The container includes a first fluid (usually in liquid form) that is mixed with a second fluid (usually ambient air drawn from the environment) in specific amounts within a mixing chamber 11 to dispense foam from nozzle/outlet 110.

Notably, the manufacturer may position the locking collar 200 during the filling and assembly of the pump 10 prior to or as it is being attached to the container 20. In this manner, the collar 200 is trapped between the actuator head and a larger diameter on the container of closure cap itself, thereby insuring the collar 200 remains attached and does not create disposable plastic waste. In some aspects, the collar 200 may be coupled to the actuator 100 and/or closure 300 (or termpoarily held thereto via integral, frangible features that also provide temper evidence). Thereafter, the collar 200 is initially released (after assembly of the pump 10), thereby achieving the same result but with the added flexibility of allowing the container to be manufactured, filled, and even assembled independently from the production of the locking assembly (i.e., actuator, closure cap, and locking collar) and/or the complete pump engine (i.e., the locking assembly and the biasing member, stem/piston, air and liquid cylinders, valving, etc.).

Biasing member 40 may take the form a plastic bellows (shown), a plastic spring, or a conventional coil, torsion, or other type of metallic spring. Biasing member 40 urges the actuator head 100 away from the closure 300 and creates negative pressure (on the upstroke) and positive pressure (on the down stroke) so as to drive the fluids through the components of the pump 10.

A stem 12 is coupled to the top end of the hollow inside of the biasing member 40 (or directly to the underside of the actuator head 100), thereby causing the piston/stem 12 to move in concert with the actuator 100. The lower end of the biasing member is affixed to the closure 300, which has a sealing plate 31 including an air inlet 42. The hollow inside of the biasing member 40 serves as air chamber 41.

Body cylinder 50 is positioned beneath the plate 31, and all of the components are configured to coaxially receive the piston/stem 31. Cylinder 50 defines the liquid chamber of the pump, and it includes appropriate inlet valving and, possibly, venting for return/make-up air to re-enter the container.

As the stem 12 moves axially up and down, the wiper element 13 on its lower end seals the inside of cylinder 50 and draws fluid/liquid from a valved inlet 52 at, in, or near the bottom end of body cylinder 50 into the liquid chamber 51. Similarly, air is pulled through interfacing surfaces of the closure 300 and biasing member 30 and into that air chamber 41 via a valved inlet 42 at the bottom of the member 30 (possible in the plate 31).

On the down stroke, a portion of air is forced between the closure plate 31 and through a vent 53 in the body cylinder 50 to provide make-up air to the inside of the container, while a known volume is forced up into the mixing chamber positioned at or defined by the top of the piston/stem 31 and/or actuator 100. Similarly, liquid previously pulled into the cylinder 50 (and/or resident in the piston/stem 31 itself) is forced up into the mixing chamber on the down stroke to produce foam that is ultimately dispensed from the outlet 110. Notably, in the locked position, wiper 13 seals off the vent 53, while the valves 42, 52 prevent the ingress or egress of fluids through the pump 10.

As will be described in greater detail below, the locking collar 200 is securely coupled to the actuator 100. Stoppers on or in the collar cooperate with a blocking shoulder on the closure cap 300. Because that cap is affixed to the container, the stoppers of the collar 200 and the shoulder prevent downward motion/compression of the head 100 and biasing member 40. However, the collar 200 can be rotated to move the stoppers out of alignment, which allows the collar 200 (either attached to the actuator 100 or selectively detached to move freely) to slide down over the shoulder of closure 300. Thus, the locking collar 200 serves as a locking mechanism and a means for controlling the stroke length of actuation.

While the air chamber in the aforementioned embodiment is defined by the biasing member, it is possible to employ a more conventional design in which the air and liquid chambers are provided in coaxially arranged cylinders. These cylinders would be partially or completely disposed within the internal volume of the container, while the biasing member would be associated with the stem/actuator to urge those components away from the closure.

Also, while the collar 200 is ideally suited for foaming dispensers, it may be possible to employ it on single fluid reciprocating dispenser pumps. In such scenarios, the elimination of disposable plastic waste and the control of dose volume, as well as all of the aforementioned aesthetic benefits, may all still be realized.

In all of these scenarios, once the pump 10 is assembled and coupled to the container, the locking collar 200 will remain attached to the pump 10. That is, owing to its hollow cylindrical design, it is impossible to detach the collar 200 from the pump 10 without completely disassembling the pump. Further, because all of the components of pump 10 are preferably made from recyclable materials (and, more specifically, the same polymer), the pump 10 can be recycled "as is," without the need for disassembly. In this manner, the locking collar 200 is an improvement over detachable clips because it avoids the creation of separately disposable plastic waste.

As a further safeguard, it is possible to impart cooperating ratchet teeth or anti-back off ribs on the interface of the closure cap and the container neck. These features resist or prevent removal of the cap from the container, thereby assuring that even in configurations where the collar may slide completely down the container neck past the lower end of the closure cap, the cap could not be easily removed so as to cause the collar become separated from the pump.

Another goal in using the locking collar is to seal the pump engine for e-commerce shipping. Specifically, the collar will lock the pump in an up-lock position. This locking collar is hollow tubular element sized to fit over and engage the actuator head or stem on one end and the closure cap on the other, thereby preventing the head/stem from moving downward unless and until the collar is displaced (e.g., by rotating and/or sliding the collar over the closure or a portion of the head). Further, the locking collar remains attached to the dispenser during normal operation, and back off ribs and/or ratchets can be provided at the interface of the closure cap and the container to insure it remains permanently affixed.

In one aspect, engagement formations couple the collar to the actuator head, which is then rotated into a "locked position" in which the bottom edge of the collar resting on an annular shoulder of the cap, thereby preventing axial movement/actuation of the pump. Gaps in the annular shoulder allow the head to be selectively rotated into an operable position and additional features, such as grooves, ramps, and other cooperating features designed to temporarily impede rotation and/or provide a tactile indication when the proper rotation has been achieved.

Along its top edge where the collar is coupled to the actuator head, formations may be provided so that the collar rotates and moves in concert with the actuator head (e.g., by way of a simple interference fit). Alternatively, the collar could be configured to rotate freely within an annular ledge or groove (or between a plurality of circumferentially spaced stoppers positioned on that ledge), so that collar remains affixed to the actuator head but can be selectively moved between locked and operable positions.

In a further aspect, the collar can be configured for tamper evidence by way of frangible bridges that detach the collar from the actuator the first time the collar is released. Specifically, the top and/or bottom portions of the collar are integrally molded with frangible bridges initially maintaining a connection between the collar and the head and/or closure. These bridges will be configured to break apart upon specific application of torque (and/or by pressing or squeezing the collar at predetermined locations(s)). As such, the bridges comprise a narrow ribbon of material with spaced apart gaps arranged around a circumference that can accommodate rotation or application force sufficient to break the bridges and free the collar from its corresponding component(s) (i.e. the actuator and/or closure). Notably, the frangible bridges could be provided in combination with coupling features so that the collar could be snap-fitted or reattached to the actuator head, thereafter rendering operation similar to other aspects noted above/herein.

Once the collar is detached, it can be slid down away from the head but, owing to its tubular nature, both the collar and the bridges remain coupled to the pump so as to prevent the creation of disposable plastic waste. This latter aspect is expected to be particularly useful for elongated container necks where the collar can remain positioned beneath the closure.

The closure could also be provided with a shoulder at the bottom that is similar/identical to the should at the top, in which case the axial stoppers on the inner facing of the collar would prevent the collar from "riding up" or interfering with the reciprocating action of the head relative to the closure.

Still other configurations might include twisting, unscrewing, and/or unsnapping the collar from the actuator head so that the collar slides down and rests partially or completely around the outer circumference of the closure cap.

In the locked position, the sealing interfaces on the piston and liquid chamber are engaged, possibly including radial force to seal the piston to the inner side wall of the body cylinder, when the pump is fully extended. The uplock position also insures that the plastic biasing member will not encounter unnecessary stresses associated with being kept in a compressed position for extended periods of time. It is believed prolonged compressive stress can degrade the performance of the all-plastic biasing member described herein.

When slid down into its unlocked or operable position, the locking collar shoulder may be configured to rest on the container so that the container (and, more specifically, a shoulder on the container proximate to its neck) serves as a stopper to prevent the collar from sliding too far down/out of position. In turn, the top edge of the collar will act as a stopper on the downward motion of the actuator head and the axial height of the collar defines the stroke length of the actuator and the compression of the biasing member/air chamber itself. Even in instances where the collar is configured to serve as tamper evidence so that it becomes permanently detached from the actuator head, the fact that the collar remains captured between the container/closure and the actuator head insures that the collar will serve as a de facto stopper element to limit the downstroke and compression of the bellows.

To the extent a user desires to adjust the qualities or consistency of the foam produced by the dispenser, the air-to-liquid ratio itself can be adjusted simply by changing the axial height of the collar. That is, the height of the collar directly impacts the volume of the air chamber in its extended and maximum compression states, with the difference being the amount of air provided. So, when a larger air-to-liquid ratio is desired, a shorter collar should be employed so as to allow the bellows to become more compressed. In situations where a smaller air-to-liquid ratio is desired, a taller collar can be employed. In either case, these adjustments are affected without altering the diameter or shape of the bellows/biasing member or the liquid chamber itself. Instead, the manufacturer can cut a single collar to the desired size or rely upon a standardized set of collars with differing axial heights so as allow for quickly and easily changing the air-to-liquid ratio without physically altering the pump engine itself.

In some aspects, a plurality of shoulders might be formed on the closure cap to allow for locking of the collar and, separately, limiting the downward travel of the collar (which, in turn, would block the downward travel of the actuator head). By controlling the downward travel the amount of fluids delivered to the mixing chamber will be likewise limited, so as to allow for dose volume alteration and/or changes to the ratio of liquid and air supplied to that chamber.

In addition to providing up lock functionality, the collars also improve the aesthetics of the pump itself. Foremost, the collar conceals the biasing member (whether a plastic bellows or a more conventional spring). Further, the collar provides an ideal means for customization. That is, indicia of origin (logos, trademarks, artwork, etc.) and instructions/printed matter can be disposed on the outer surfaces of the collar. In this manner, a pump can be given a specific, customized look simply by providing a unique collar (while all of the other elements can remain identical). Indicia of locking and operable positions can also be included, with aligning features on the collar and shoulder and/or head.

Further still, so long as the collar is circumferentially captured around the stem and formed with sufficient axial compression strength to serve as an up lock, the collar can be provided in a number of unique or different shapes. For example, a series of distinctive and/or decorative slots or apertures could be employed and/or the surface of the collar could be textured, imprinted, or overlaid with labels or other decorative features.

As a still further aesthetic consideration, any stoppers, shoulders, or coupling features required to attach the collar to the head/closure can be concealed so as to impart a "cleaner" design. That is, any grooves, gaps, or ribs need not be visible and, instead, can be positioned on interfacing surfaces that will never be seen by the user.

Turning to FIGS. 3A through 8, specific aspects and features of the locking assembly 1 are shown. Notably, some of these features may be optional and/or combinable with one another. Thus, the illustration of specific embodiments in these Figures should not be taken as limiting to the broader functions, purposes, and goals stated herein.

Figure 3A:
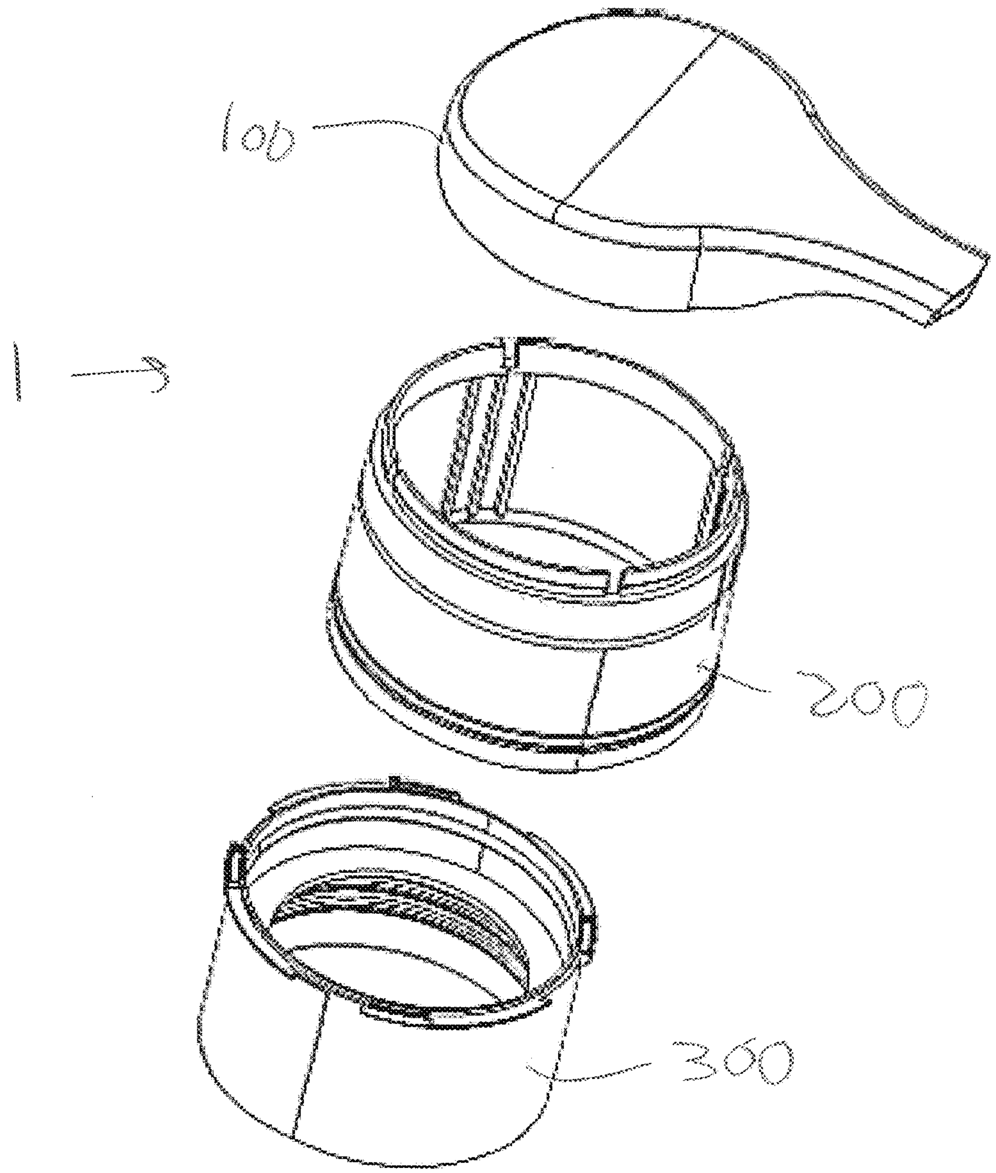

Assembly 1 comprises locking collar 200 interposed, at least in its initial locked position, between the actuator 100 and the closure 300 as shown in the exploded view of FIG. 3A. Generally speaking, Collar 200 is effectively a hollow tube or cylinder of sufficient diameter to fit around the pump engine (and, more specifically, the stem). Actuator 100 is similar to conventional pump heads, in that it defines a flow channel connecting the pump engine to outlet 110. Actuator 100 is also configured to engage a biasing member to enable the reciprocating action of the pump engine. Closure 300 is also similar to conventional systems in that it is configured to attach to a container, usually by way of threaded engagement. Closure 300 also couples to portions of the pump engine but, because the closure 300 is attached to the container, it facilitates the reciprocating action by providing an anchor point for the biasing member.

Figure 3B:
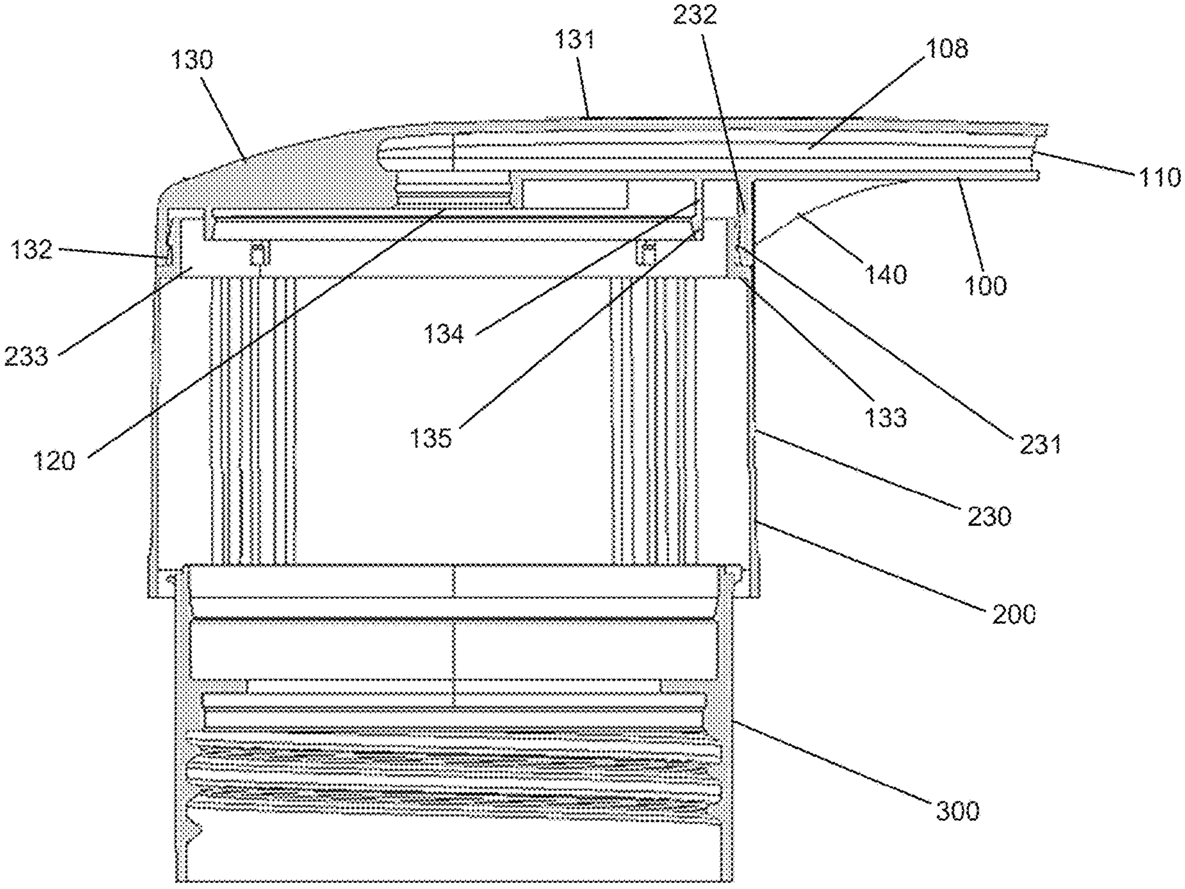
FIG. 3B is a cross sectional view of those components as assembled (but with the pump engine omitted).
Figure 4:
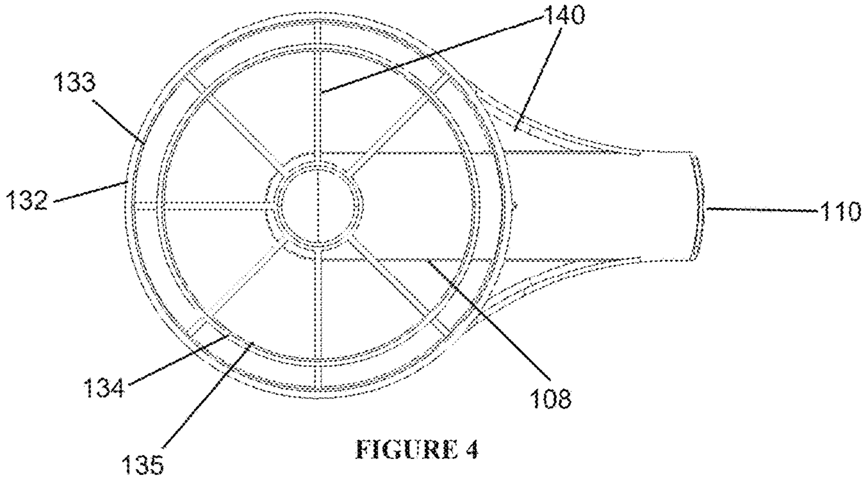
FIG. 4 is a bottom plan view of the actuator head, illustrating how the downward extending skirt from the actuator may be positioned to couple to the locking collar.

Further details of the arrangement and attachment of locking assembly 1 components can be discerned from FIG. 3B. Actuator 100 includes a horizontal or slightly inclined flow channel 108 terminating at outlet 110. Channel 108 is also fluidically connected to an axial passage 120 which defines or receives the mixing chamber. An outer shell 130 encases the channel 108 and may include a flattened top portion 131 and an outer axial skirt 132. Support ribs 140 may be provided to impart strength and greater structural integrity to the actuator, particularly in view of the axial/compressive forces it must directly sustain.

An outer peripheral skirt 132 extends down from shell 130. Outer skirt 132 may include coupling features 133, such as beads, grooves, bayonet-style tabs, and the like, along its entire circumference or at selected positions or arcuate sections. Similarly, an inner skirt 134 with similar coupling features 135 may be positioned coaxially within the outer skirt 132. One of the skirts 132, 134 may couple to the biasing member (not shown), while the other engages a feature 233 on the locking collar 200 (possibly at extension wall 230 described below).

In some aspects, it is possible to configure the coupling features 133, 135 to allow the collar 200 to be selectively detached. For example, the coupling features 133, 135 could be intermittent and spaced apart enough that, when the locking collar is compressed in the radial direction, the collar 200 flexes sufficiently to disengage. In this arrangement, it is also possible, through the use of a tapered or angled tab (like those shown in FIG. 3B), the collar 200 could be reattached. In turn, this ability to disengage and reattach the collar (in combination with aligning the necessary stoppers) would allow the user to decide when to place the pump in a locked state.

Conversely, the coupling between the actuator 100 and collar 200 could be made permanent. In this arrangement, the actuator 100 and collar 200 must either rotate in concert (so as to allow for alignment of stoppers in the locked state) or the coupling feature 233 of the collar 200 can be configured to slide freely and independently from the actuator. If the feature 233 slides freely, arcuate stoppers can be positioned on the feature 133, 135 to define a range of rotation, possibly with small beads or grooves included to produce tactile feedback for the used as these parts slide over one another. As above, the stoppers on the collar 200 must be rotated to a position where they no longer abut stoppers on the closure (i.e., they are no longer in a locked state), thereby allowing the collar to slide and the pump to reciprocate.

Locking collar 200 is a hollow tube, preferably circular, but shaped to conform to and rotate relative to the actuator 100 and closure 300 as described herein. Side wall 230 defines an inner chamber 210 configured to receive elements of the pump engine, such as the biasing member and/or stem. Actuator engagement features 220 are provided at the top end of the cylinder 200. In particular a flange or shoulder 231 may extend radially inward to create sufficient offset for an axial extension 232. Coupling features 233 (as described above) may be disposed on the inner or outer facing of the extension 232.

Figure 5A:
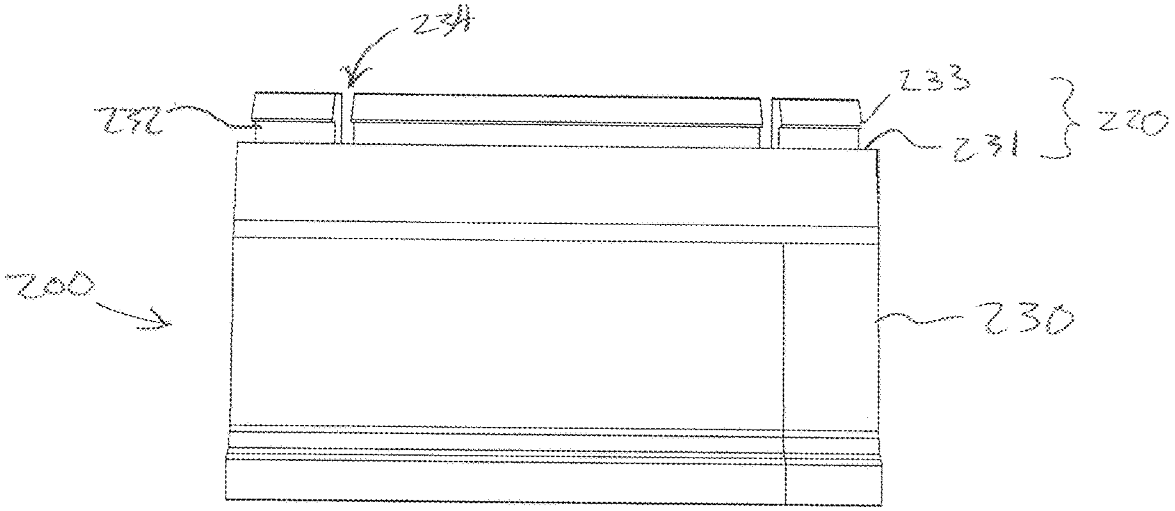
Figure 5B:
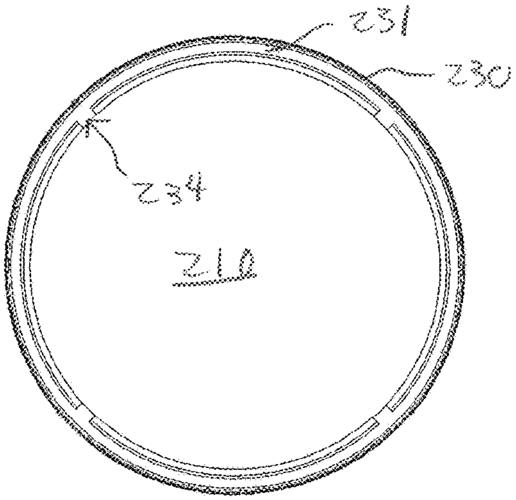
FIGS. 5B and 5C are (respectively speaking) top plan and bottom plan views thereof.
Figure 5C:
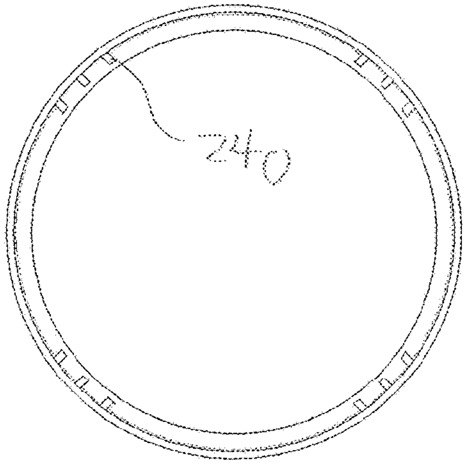

To the extent a continuous tab or engagement flange is provided as shown for feature 233 in FIG. 5A, it is possible to provide gaps 234 in extension wall 232. These gaps 234 allow the wall 232 to flex as the features 133 (or 135), 233 engage. Additionally or alternatively, gaps 234 can be formed in sufficiently large arcs to engage rotational stoppers formed on the actuator 100 (e.g., as protrusions on or proximate to the wall 132 or 134.

Figure 5D:
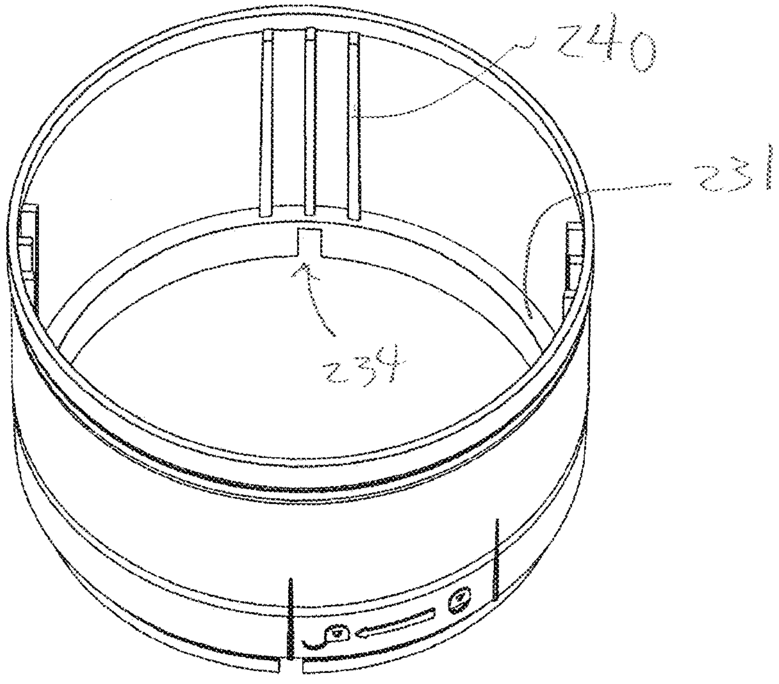
FIG. 5D is a three dimensional, perspective view of the bottom edges of the locking collar, including a view of the axial stoppers positioned along its inner facing.
Figure 6A:
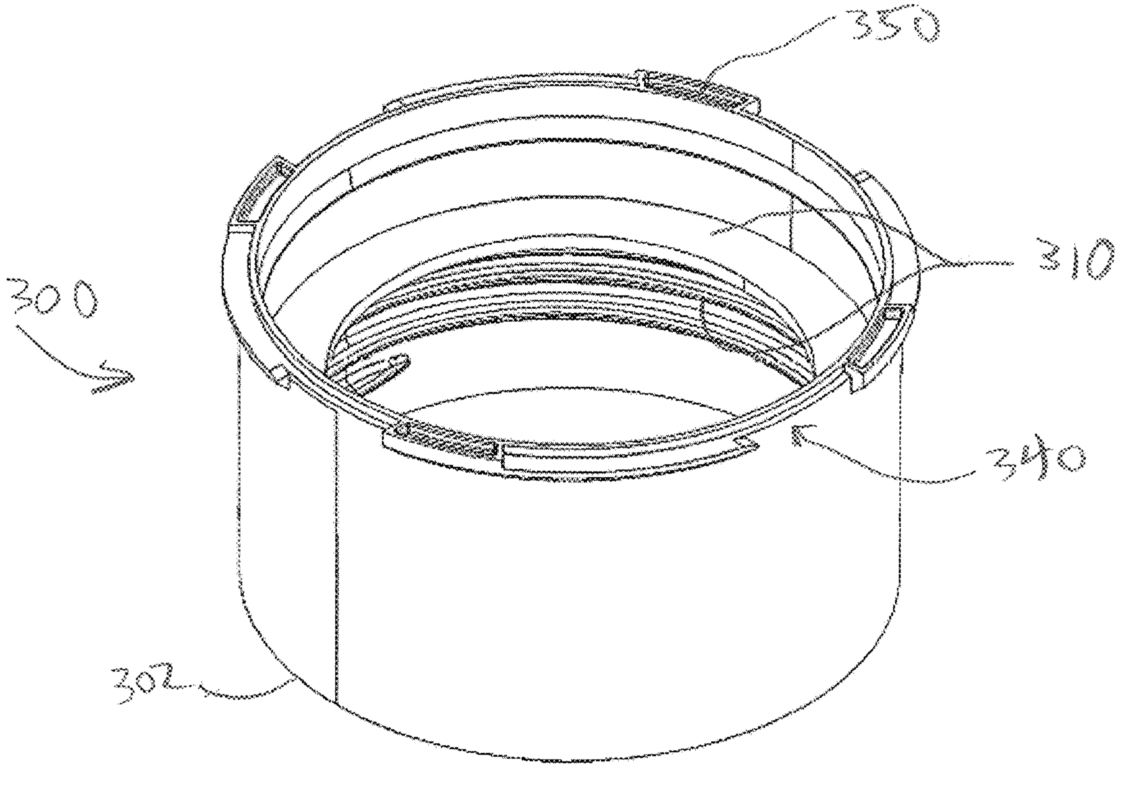
Figure 6B:
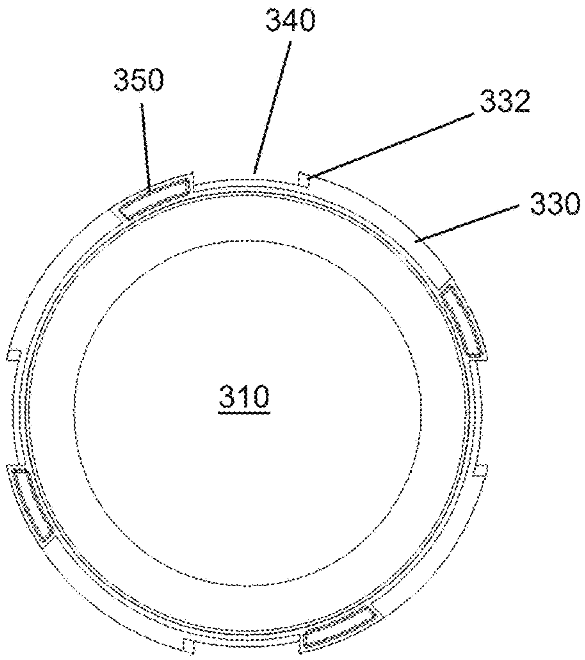
FIGS. 6B and 6C are (respectively speaking) top plan and side plan views thereof.
Figure 6C:
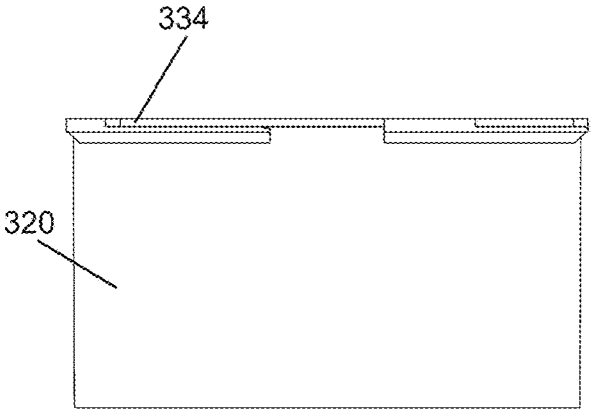
Figure 7A:
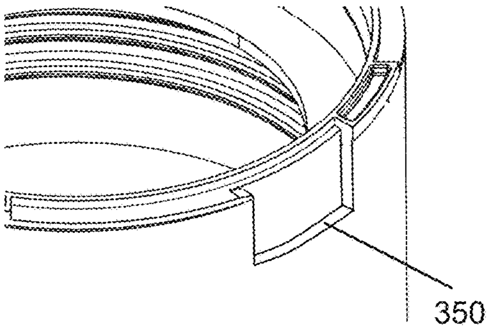
FIG. 7A is a three dimensional sectional view and FIG. 7B a side plan view, both illustrating an alternative in which a second shoulder (or, via a series of steps, a plurality of shoulders) might be employed to limit the axial travel distance of the actuator head for purposes of limiting dose size and/or achieving desired foam characteristics.
Figure 7B:
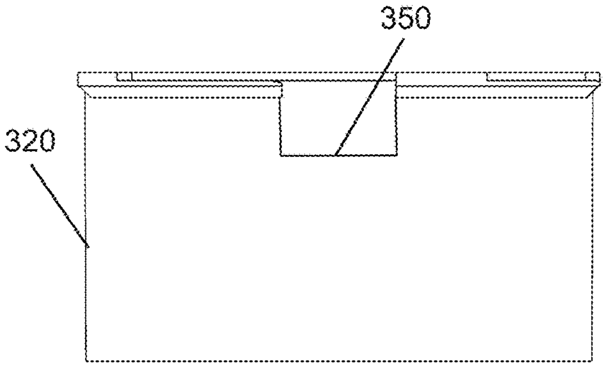

Along the inner facing of wall 230, stoppers 240 in the form of one or more axially aligned ribs or protrusions, are formed. These stoppers 240 cooperate with various formations on the closure 300 to provide locking functionality. In some aspects, up to three ribs can be grouped together at equally spaced intervals (four, as shown in FIG. 5D). The stopper ribs 240 occupy an arcuate section of the circumference that is less than the arcuate gap section 340 formed in the closure 300.

In some aspects, the plurality of stoppers 240 all terminate at the same axial height (relative to wall 230, possibly even at its lower most end/edge). However, one of the stoppers 240 (e.g., a middle stopper) could extend beyond one axial length of the others. Particularly in the case of the stoppers 240 having different axial lengths (but not necessary a requirement), one or more of the stoppers 240 may be configured to slide over and selectively engage a catch feature 350, which can be formed as a blocking protrusion or pocket, with the longer stopper possibly (but not necessarily) facilitating that movement.

Alternatively, a single rib with varying features (detents, bead/groove, etc.) on its lower edge could be provided. Also, the stopper(s) 240 may be axially aligned with the gaps 234 to improve the overall rotation and fitting of the collar 200 within the assembly 1.

Closure 300 defines a central aperture 310 surrounded by sidewall 320. A radial shoulder or flange 330 is provided intermittently around the circumference of the wall 320. The radial extension of the flange 330 is of sufficient width (i.e. outer vs. inner diameter) to provide a stopping surface for the axial stoppers 240 along the periphery of the closure 300. In some aspects, the shoulder/flange 330 will be dispose flush with or near the top edge of the closure 300 where it first interfaces with the bottom edge of the collar 200. A ramped section 332 may be provided at one edge of the gap 340 to facilitate rotation from the locked to operable states. Also, in some aspects, a stopper wall 334 may be provided to prevent further rotation and provide an indication of when the collar has been rotated to the locked state.

Attachment formations 310 are disposed on an inner facing of the wall 320. These formations 310 allow for engagement/coupling to the pump engine and, separately, to the container neck itself. Formations 310 may take any number of forms, including threads, bead and groove, other interference fits, and the like. In some aspects, the coupling features 310 for attachment to the container could be disposed along an outer facing of the wall 320, either along an inset position (to make the outer diameter of the container at the neck equal to or smaller than the outer diameter of the bottom edge 302 of closure 300) or with the understanding that that the larger diameter of the container neck might serve as a secondary stopper to arrest the downward movement of the collar 200.

In a further aspect, a secondary shoulder 350 can be provided on the sidewall 320 at a lower axial elevation than flange 330. This difference in elevation represents the maximum axial travel that the actuator 100 may attain, either because the stoppers 240 move in concert with the actuator 100 and strike the ledge 350 when the collar is affixed to the actuator 100 or because the collar 200 has already been lowered down to this level and the top end(s) of the stopper 240 impede the downward motion of the actuator 100.

In either case, the axial travel distance equates to the volume of fluid(s) that can be drawn into and dispensed by the pump engine. This axial travel distance also factors into the volume of air and/or liquid provided to the mixing chamber and, therefore, adjustment of this distance may impact the foam characteristics. Similarly, a manufacturer may rely upon separate collars and/or configurations of closures, including their stopping shoulder(s) to alter this axial travel. As a further alternative, a manufacturer may cut off sections of the sidewall 300 proximate to end 302 in order to alter the axial travel distance. In either situation, this enables the manufacture to adjust the volume and/or characteristics of the dispensed fluid or foam without having to alter any of the dimensions of the pump engine itself. As such, this provides significant flexibility to use standardized components without changing the container neck or pump 10 itself (excepting the collar or closure).

Figure 8:
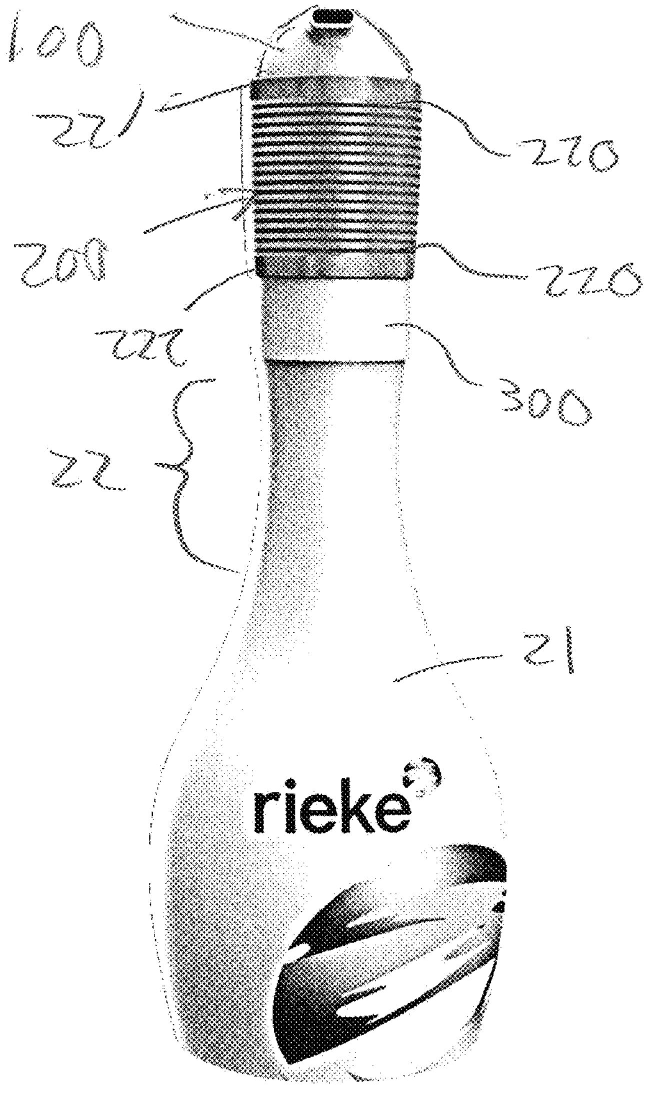
FIG. 8 is a three dimensional side view of a long neck container style also appropriate for use with the locking collar, as well as illustrating tamper evident features that may be incorporated into the locking collar and either the actuator head or the closure cap.

With respect to FIG. 8, a long-neck container 21 includes a closure 300 of larger diameter than the neck. This configuration insures that the collar 200 can be pushed down below the closure 300 onto neck portion 22 when the collar is not locked and released from the actuator 100. While not exclusive to container 21, this arrangement facilitates the use of frangible bridges 220.

Bridges 220 attach top and/or bottom bands 221, 222 on the collar to their respective abutting elements, actuator 100 and closure 300. Alternatively, the bridges 220 can connect from the top and/or bottom edges of the closure 200 itself. In either instance, these bridges 220 are formed via injection or other molding so that collar 200 is formed integrally with actuator 100 and/or closure 300. The operation of the locking assembly 1 is unaffected, but the bridges 220 will necessarily break the first time the collar is rotated and/or moved axially up or down. In this manner, the broken bridges (and/or separation from bands 221, 222) can provide evidence of prior opening/use/tampering. Therefore, locking collar 200 may also serve the role of tamper evidence in addition to the other features and functions described herein.

In one aspect, a lockable dispensing pump is envisioned. This pump includes a reciprocating engine pump configured to draw one or more fluids from a container and dispense the fluid from an outlet and a locking assembly made entirely of polymeric components which remain affixed to the dispensing pump so as to prevent creation of disposable plastic waste. The locking assembly has an actuator defining the outlet and configured to reciprocate in conjunction with the pump engine; a closure cap attached to the container and having a peripheral stopper; and a locking collar having a hollow cylinder coaxially receiving at least a portion of the pump engine and at least one axial stopper disposed on an inner facing of the cylinder, said locking collar interposed between the actuator head and the closure cap and rotatable relative to the closure cap so that, when the axial stopper is aligned with the peripheral stopper in a locked position, the actuator head will not reciprocate. In this aspect, the pump engine is configured so as to seal and prevent loss of the fluid from the container when the locking collar is in the locked position. Additional features may optionally include any one or combination of the following:

- one or more tamper evident frangible elements are initially and integrally formed between the locking collar and at least one of the actuator head and the closure cap;
- wherein a second stopping shoulder is on the closure cap at a different axial position but a similar circumference in comparison to the peripheral stopper;
- wherein the locking collar is coupled to the actuator head;
- wherein the locking collar rotates in concert with the actuator head;
- wherein the locking collar is configured to coaxially conceal a biasing member of the pump engine, said biasing member interposed between the closure cap and the actuator head;
- wherein the axial stopper is one or more ribs and the peripheral stopper is a flange having one or more gaps through which the one or more ribs may travel when the locking collar is not in the locked position;
- wherein gaps are interposed between the peripheral stoppers, said gaps sized to allow axial transit of the axial stoppers when collar is not in the locked position;
- wherein the shoulder includes formations to resist rotation of the axial stopper relative to the closure cap;
- wherein a top edge of the locking collar includes a coupling feature received in a corresponding feature formed on at least one of the actuator and the closure cap;
- wherein the coupling feature is provided along corresponding arcuate or annular interfaces of the locking collar and at least one of the actuator and the closure cap;
- wherein the coupling feature are a pair of opposing radial projections; and
- wherein the coupling feature is selectively disengaged so as to allow the collar to release from the actuator head and/or closure cap.

Additional aspects of the invention are drawn to a method of dispensing foam and a method of eliminating plastic waste in the construction of foaming dispensers. With respect to the former, the method includes providing a foam dispenser system having a container with liquid, a reciprocating plunger, a compressible biasing member serving as the air chamber, and a rigid liquid cylinder, wherein liquid from the container is mixed with air when the reciprocating plunger is actuated; disposing a collar around the reciprocating plunger when the dispensing system is assembled and positioning the collar to dictate the volume of air drawn into the air chamber when the reciprocating plunger is actuated; and selecting an axial height for the collar that corresponds to an air-to-liquid ratio that produces a desired consistency of foam. As for the latter, the method involves providing a foam dispenser pump having a closure cap and a reciprocating plunger; providing a hollow cylindrical locking collar and capturing the collar between the closure cap and the reciprocating plunger; and positioning the cylindrical collar so that one or more axial stoppers on the collar abut one or more peripheral stoppers on the closure cap, as well as the option of integrally forming the locking collar so that it is connected by frangible elements to at least one of the closure cap and the reciprocating plunger prior to capturing the cylindrical collar between the closure cap and the reciprocating.

All components of the pump dispenser should be made of materials having sufficient flexibility and structural integrity, as well as a chemically inert nature. Certain grades of polypropylene and polyethylene are particularly advantageous, especially in view of the absence of any thermosetting resins and/or different, elastomeric polymer blends. The materials should also be selected for workability, cost, and weight. Common polymers amenable to injection molding, extrusion, or other common forming processes should have particular utility.

References to coupling in this disclosure are to be understood as encompassing any of the conventional means used in this field. This may take the form of snap- or force fitting of components, although threaded connections, bead-and-groove, and slot-and-flange assemblies could be employed.

Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A dispensing pump capable of being selectively locked to prevent actuation, the pump comprising:

a reciprocating pump engine configured to draw one or more fluids from a container and dispense a fluid from an outlet; and a locking assembly made entirely of polymeric components which remains permanently affixed to the dispensing pump;

an actuator defining the outlet and configured to reciprocate in conjunction with the reciprocating pump engine;

a closure cap attached to the container and having a peripheral stopper;

wherein the locking assembly includes: i) a locking collar having a hollow cylinder coaxially receiving at least a portion of the reciprocating pump engine and at least one axial stopper disposed on an inner facing of the hollow cylinder, said locking collar interposed between the actuator and the closure cap and rotatable relative to the closure cap so that, when the at least one axial stopper is aligned with the peripheral stopper in a locked position, the actuator will not reciprocate and ii) one or more tamper evident frangible bridges that are initially and integrally formed between the locking collar and at least one of the actuator and the closure cap, said one or more tamper evident frangible bridges all configured to break without separating from the locking assembly and the actuator and/or the closure cap; and wherein the reciprocating pump engine is configured so as to seal and prevent loss of the fluid from the container when the locking collar is in the locked position.

2. The pump according to claim 1 wherein a second stopping shoulder is on the closure cap at a different axial position but a similar circumference in comparison to the peripheral stopper.

3. The pump according to claim 1 wherein the locking collar is coupled to the actuator.

4. The pump according to claim 1 wherein the locking collar rotates in concert with the actuator.

5. The pump according to claim 1 wherein the locking collar is configured to coaxially conceal a biasing member of the pump engine, said biasing member interposed between the closure cap and the actuator.

6. The pump according to claim 1 wherein the at least one axial stopper is one or more ribs and the peripheral stopper is a flange having one or more gaps through which the one or more ribs may travel when the locking collar is not in the locked position.

7. The pump according to claim 1 wherein gaps are interposed between two peripheral stoppers, said gaps sized to allow axial transit of all axial stoppers when the locking collar is not in the locked position.

8. The pump according to claim 1 wherein a shoulder formed on the closure cap includes formations to resist rotation of the at least one axial stopper relative to the closure cap.

9. The pump according to claim 1 wherein a top edge of the locking collar includes a coupling feature received in a corresponding feature formed on at least one of the actuator and the closure cap.

10. The pump according to claim 9 wherein the coupling feature is provided along corresponding arcuate or annular interfaces of the locking collar and at least one of the actuator and the closure cap.

11. The pump according to claim 9 wherein the coupling feature is a pair of opposing radial projections.

12. The pump according to claim 9 wherein the coupling feature is selectively disengaged so as to allow the locking collar to release from the actuator head and/or closure cap.

* * * * *